United States Patent [19]

Anello et al.

[11] Patent Number: 5,727,054
[45] Date of Patent: Mar. 10, 1998

[54] ANTI-STUFFING COIN RETURN ASSEMBLY

[75] Inventors: Salvatore Anello, Highland; Albert F. Diaz, Lynbrook, both of N.Y.

[73] Assignee: Sandt Technology, Ltd., Marlboro, N.Y.

[21] Appl. No.: 595,619

[22] Filed: Feb. 2, 1996

[51] Int. Cl.[6] .................................................. H04M 17/00
[52] U.S. Cl. ........................ 379/145; 379/143; 379/150; 379/451
[58] Field of Search .................................. 379/145, 143, 379/149, 150, 155, 437, 440, 451, 147, 148; 194/202, 203, 204; 232/57.5

[56] References Cited

U.S. PATENT DOCUMENTS

| | | | |
|---|---|---|---|
| 5,018,193 | 5/1991 | DeArkland | 379/145 |
| 5,400,396 | 3/1995 | Hsu | 379/145 |
| 5,431,338 | 7/1995 | Ashkenazi | 379/145 |

*Primary Examiner*—Curtis Kuntz
*Assistant Examiner*—Binh K. Tieu
*Attorney, Agent, or Firm*—Joseph B. Taphorn

[57] ABSTRACT

An anti-stuffing device involves removing the floor at the end of the coin return chute to create a floor opening, placing a wall over the end of the chute to stop coins coming down the chute, pivotally mounting at the bottom end of the wall a compound lever so that its one leg closes-off the floor opening when in a first position towards which it is biased, and attaching one end of a compression spring to the other leg of the compound lever and its other end to the bottom of the pivoted door normally closing-off the front opening to the coin return bucket. The spring is of such length that when the bucket door is closing-off the front opening, it yieldably urges the compound lever to its first position closing-off the floor opening and when the lower end of the bucket door is pushed inward it pushes the compound lever so that its one leg moves away from the floor opening and allows the pay telephone user's coins for uncompleted calls to be retrieved by him. Methods defeat old and new stuffing techniques.

7 Claims, 2 Drawing Sheets

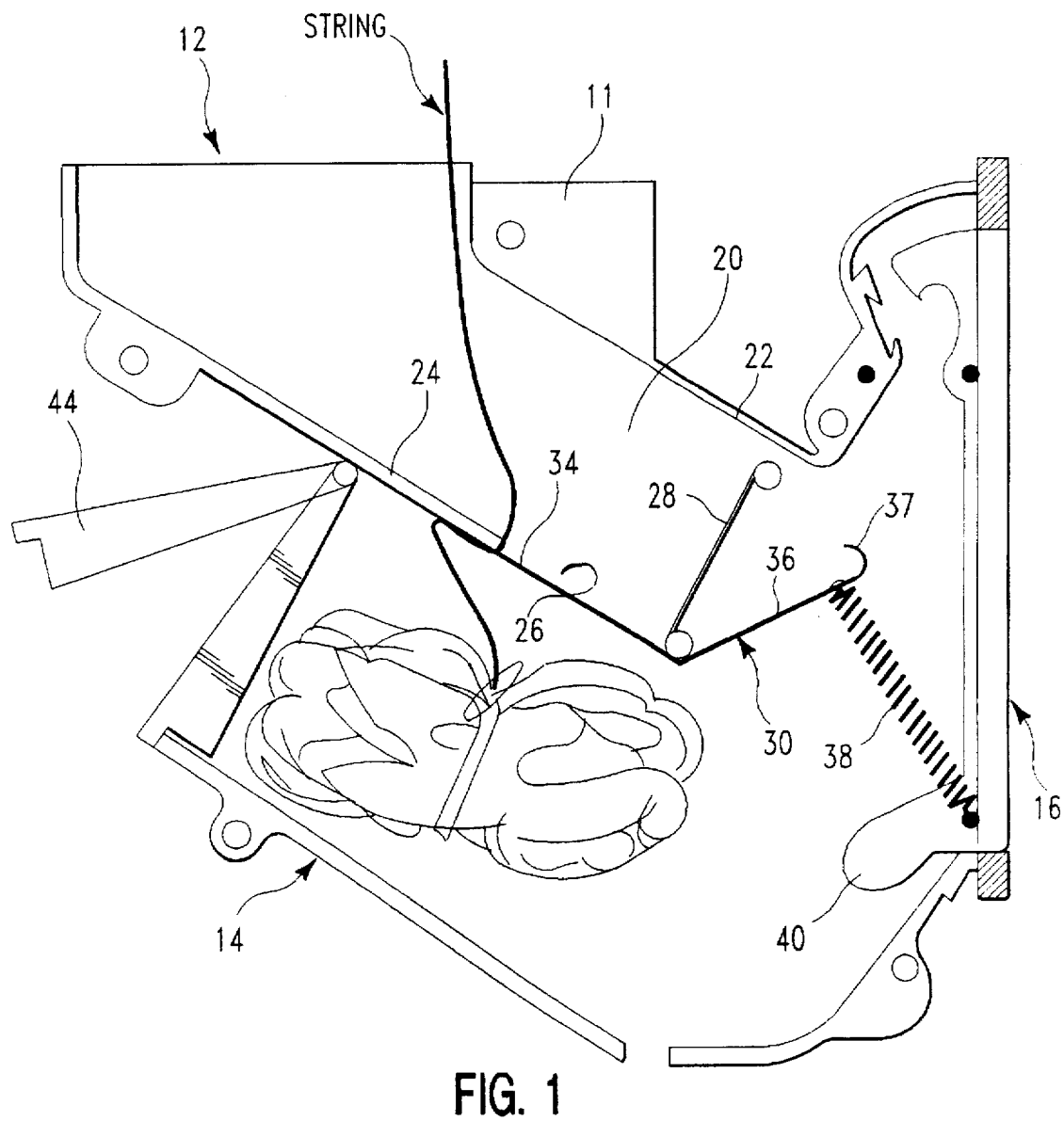
FIG. 1
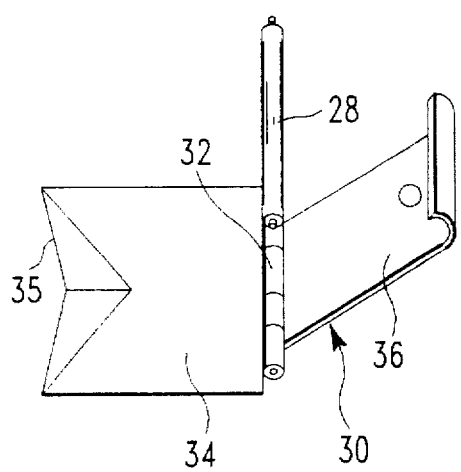
FIG. 4
FIG. 3

5,727,054

ANTI-STUFFING COIN RETURN ASSEMBLY

INTRODUCTION

1. Field of the Invention

This invention relates to coin operated pay telephones and more particularly to mechanisms for preventing the stuffing of the coin return chute of pay telephone.

2. Background of the Invention

Coin operated pay telephones have a coin return chute through which deposited coins are returned to the would-be caller for uncompleted calls. The chute dumps the coins into the coin return bucket. The would-be caller retrieves his coins by pushing-in the bottom of a pivoted door normally closing off a front opening to the bucket, with a finger which then extends over the coins and drags them out as it is retrieved.

Vandals obtain these to-be-returned coins for themselves by blocking the lower end of the return chute with material so that the coins are trapped in the chute and not made available in the coin return bucket for retrieval by the would-be-caller. Periodically the vandal returns to remove momentarily, or tempoarily depending on his strategy, the blockade material so that the coins fall into the coin return bucket for retrieval by him.

Past vandal practice has involved stuffing a large wad of material in the coin return bucket so that the lower end of the coin return chute is blocked. However pay telephone users have become more savy and when coins are not returned, look for stuffing and remove it to gather their coins. Competing vandals have become more savy and identify pay telephones with coins to be appropriated by them by just looking in the coin return bucket for stuffing. Accordingly, the stuffing vandal has resorted to a more sophisticated trick.

The more sophisticated trick is to cut a small hole in a quarter, tie a string such as dental floss to the quarter through the hole, and pass the quarter down through the phone, making sure that a call was not completed. When the vandal retrieves the quarter out of the coin return bucket, he removes it from the string and ties the now free end of the string to stuffing material such as a supermarket plastic bag for customer packaging of vegetables. The vandal now takes the other end of the string still dangling out of the coin entry slot, and pulls on it to bring in the stuffing material through the coin return bucket into the lower end of the coin return chute where the stuffing is no longer visible from a mere inspection of the coin return bucket. The upper end of the string is now cut off to remove evidence that the pay phone has been tampered with.

As noted above, periodically the vandal returns to remove the blocking material so that the coins fall into the coin return bucket for retrieval by him. He removes the stuffing material up in the coin return chute by inserting a thin wire past the side of pivoted door normally closing off the opening to the coin return bucket, into the coin return bucket and up into the lower end of the coin return chute to engage the stuffing and remove it.

3. Prior Art

The prior art anti-stuffing devices include that of the patent to DeArkland (U.S. Pat. No. 5,018,193—May 21, 1991), and Anello et al (U.S. Pat. No. 5,102,038—Apr. 7, 1992). DeArkland fixes a downwardly and rearwardly extending first gate plate to the lower end of the pivoted coin return door, and a pivoted second gate plate to the lower forward end of the floor of the coin return chute and so that it extends downwardly and rearwardly into contact with the top surface of the first gate plate to seal off vandal access to the coin return chute while allowing coins to drop onto the upper surface of the first gate plate and move downwardly and rearwardly thereon and pushing the second gate plate up so that they enter the coin return bucket. Anello et al prevent thieves from stuffing by sealing-off the coin return chute when the bucket door is opened, and by incorporating a blocking flap and a slot blocking plate with a V-shaped notch having sharpened edges.

SUMMARY OF THE INVENTION

Accordingly it is an object of the present invention to provide a new and improved coin return bucket for pay telephones.

Another object of the invention is to provide an new and improved anti-stuffing mechanism for pay telephone coin return buckets.

A further object of the invention is to provide an anti-stuffing mechanism that is effective to prevent string stuffing of the coin return chute of a pay telephone.

Still another object of the invention is to provide an anti-stuffing mechanism that is effective against both the new and the old vandal stuffing techniques.

Yet another object of the invention is to provide a pay telephone anti-stuffing coin return bucket that is simple and easy of construction and inexpensive of manufacture.

An additional object of the invention is to provide an improved anti-stuffing assembly which can be incorporated in existing pay telephone installations.

The objects of the invention are achieved by removing the floor at the end of the coin return chute to create a floor opening, placing a wall over the end of the chute to stop coins coming down the chute, pivotally mounting at the bottom end of the wall a compound lever so that its one leg closes-off the floor opening when in a first position towards which it is biased, attaching one end of a compression spring to the other leg of the compound lever and its other end to the bottom of the pivoted door normally closing-off the front opening to the coin return bucket, the spring being of such length that when the bucket door is closing-off the front opening, it yieldably urges the compound lever to its first position closing-off the floor opening and when the lower end of the bucket door is pushed inward it pushes the compound lever so that its one leg mores away from its floor opening closing position and allows the pay telephone user's coins for uncompleted calls to be retrieved by him.

The yielding nature of the compression spring protects the coin return mechanism in the case stuffing material placed in the coin return bucket according to the old vandal practices. A door at the rear of the coin return bucket allows easy removal of any such stuffing material by the savy user. Either a finger or a rod may be inserted into the coin return bucket front opening to push the stuffing material straight back out the back opening. The user's coins will be returned to him once the stuffing material clears the one leg of the compound lever moving under the bias of the compression spring when the bucket door is pivoted inwards.

Stuffing of the lower end of the coin return chute is prevented altogether. To this end the rear edge of the leg of the compound lever closing-off the floor opening is made sharp so that any string moved past it will be cut, thereby preventing stuffing material from being pulled up into the coin return chute. The leg overlaps the floor to insure that any string being pulled up the chute is forced against the sharp edge of the leg. The edge is made somewhat concave to insure that any string moved thereagainst remains in engagement with the sharp edge and does not slide off to one side or the other. Any stuffing material left in the bucket as a result of the string cutting action, can be removed in normal fashion.

BRIEF DESCRIPTION OF THE DRAWINGS OF A PREFERRED EMBODIMENT

These and other objects, features and advantages of the invention will become apparent from a reading of the following description of a preferred embodiment of the invention, when considered with the appended drawings wherein:

FIG. 1 is a cross-sectional side view of the new anti-stuffing coin return bucket showing the compound lever in its floor-opening closing position when the front coin return bucket door is in its normal closing position, and showing the knife edge of the leg of the compound lever closing the floor opening in position to cut the string of a vandal effort to pull stuffing material into the bottom end of the coin return chute;

FIG. 3 is a view in perspective of the end wall of the coin return chute; and

FIG. 4 is a view in perspective of the compound lever and the end wall on which it is pivoted.

DETAILED DESCRIPTION OF THE PREFERRED EMBODIMENT OF THE INVENTION

Figure 2:
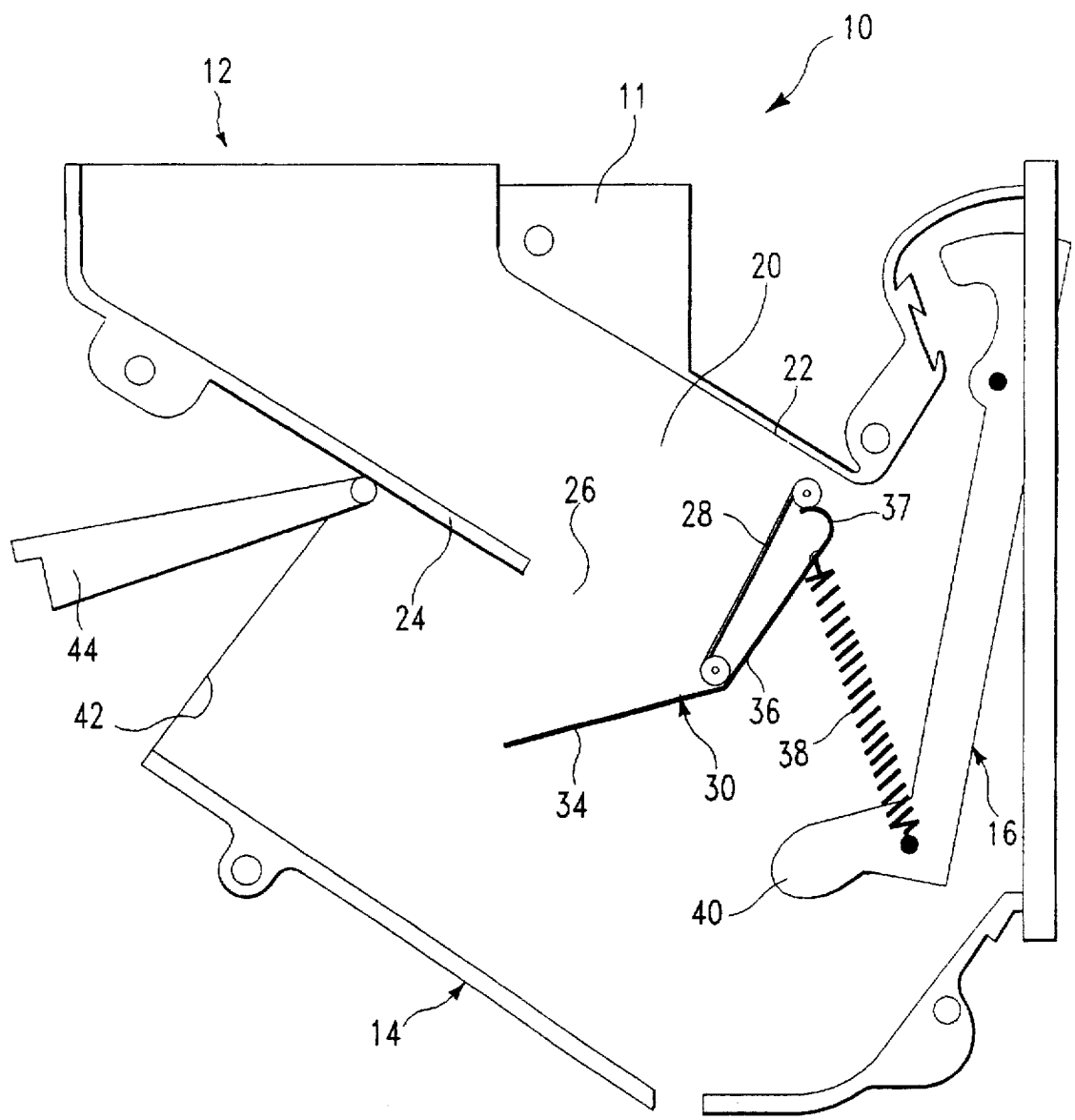
FIG. 2 is a cross-sectional side view of the same anti-stuffing coin return bucket but showing the compound lever in it floor-opening opening postion when the front coin return bucket door is pivoted inward at its lower end.

Referring now to the drawings, a coin return bucket assembly generally indicated by the numeral 10 is shown as including a housing 11 constituted of two complementary halves brought together and so secured during manufacture by conventional means, to form a coin return chute generally indicated by the numeral 12 and a coin return bucket generally indicated by the numeral 14. A door generally indicated by the numeral 16 and conventionaly pivoted at its upper end for closing by gravity, closes-off a coin return bucket front opening through which returned coins are generally retrieved via finger insertion and withdrawal. A door generally indicated by the numeral 16 and pivoted at its upper end for closing by gravity, closes-off a back opening for displacing vandal stuffing material in the bucket 14.

The coin return chute 12 is generally rectangular in cross-section and includes side walls 20, a roof 22, and a floor 24. The floor 24 terminates short of the bottom end of the chute as defined by the side walls 20 and roof 22 to form a floor opening 26 for the egress of coins. An end wall 28 affixed to the side walls 20 in conventional fashion as by laterally extending pins at its top and bottom ends that are received in complementary apertures in the side walls 20, closes-off the bottom end of the chute 12 to stop to-be-returned coins from leaving the end of the chute.

The egress or discharge of coins from the chute 12 through the floor opening 26 is controlled by a compound lever generally indicated by the numeral 30. The lever 30 is pivoted at a midpoint on the lower end of the wall 28 by conventional means such as pins extending inwardly from the bottom laterally extending pins mounting the end wall on chute side walls, which receive a reduced central and annular portion 32 (FIG. 4) of the lever 30. The lever 30 has a first leg 34 which is of a length and width sufficient to close off the floor opening 26. Preferably it is of a length sufficient to overlap the end of the floor 24, and its free end is provided with a somewhat concave sharp edge 35 (FIG. 4) for cutting any string that a vandal attempts to move past it. The concavity tends to keep the string opposite the sharp edge.

The compound lever second leg 36, fixedly connected to the first leg through the annular portion 32, which may be of reduced width compared to the first leg 34, is angularly disposed with respect to the first leg so as to be generally perpendicular in the closed position of the leg 34 to a compression spring 38 attached near its free end to it. The free end of the leg 36 is curled rearward at 37 to strike the wall 28 or structures associated with it to stop the movement of the compound lever from the opening 26 closing position, on inward movement of the bucket door 16.

The other end of the compression spring 38 is attached to the lower end of the door 16 closing-off the coin return bucket front opening. The spring 38 is of such length that in the closed position of the coin bucket front door 16, the compound lever leg 26 is in chute floor opening 26 closing position (FIG. 1), the gravity bias on the door 16 controlling the position of the parts in normal circumstances as the compound lever 30 is somewhat evenly gravity biased about its pivot on the lower end of the wall 28. Of course, displacement by a finger of the door 16 inwardly to retrieve coins, acts throught the compression spring 38 to rock the compound lever 30 about its pivot point so that its leg 26 moves away from its floor opening 26 closing position and allows any coins collected in the coin return chute by being stopped by the end wall 28, to be discharged down into the coin return bucket under the force of gravity from where they may be retrieved by the door displacing finger.

Should an effort have been made to block the discharge of coins from the coin return chute 12 in conventional manner as by leaving a wad of stuffing material in the coin return bucket, inward movement of the bucket door 16 will not injure the compound lever 30 or other structures as the spring 38 is sufficiently weak to give in such circumstances. On the other hand, the lower end of the door 16 is provided with an inward extension 40 to aid in pushing the stuffing material rearward and out a back opening 42. A savvy user will complete the rearward and out displacement of the stuffing material by a suitable instrument such as a pencil. A door 44 normally closes-off the bucket back opening 42; vandal access to the coin return chute via the back opening 42 is precluded by the back wall on which the telephone is mounted.

Should a vandal attempt stuffing by the more sophisticated technique of first passing a coin cut with a hole and attached to a string such as dental floss through the phone and retrieving it from the coin return bucket in conventional fashion, then detaching the coin and attaching stuffing material such as a crumpled-up plastic grocery bag of vegetables and pulling on the upper end of the string still sticking out of the pay telephone coin entry slot in an effort to cause the lower end of the string to draw the stuffing material into the coin return bucket and up into the coin return chute, the string will be cut by the sharp edge of the lever leg 34. The cut-off stuffing material can be removed in the usual fashion from the coin bucket.

It should be observed that applicants have provided a method for blocking the stuffing of the bottom opening of a pay telephone coin return chute from the front opening of a coin return bucket. The method comprises the steps of making the outlet opening 26 of the coin return chute 12 generally horizontal, pivoting a chute outlet closing lever 34 at the front end of the outlet opening and biasing it to a chute outlet closing position, and yieldably swinging the lever 26 away from the chute outlet closing position when the door 16 for the front opening of the coin return bucket 14 is swung inward. The front pivotal mounting of the chute outlet lever 34 and the yieldable swinging of it away from its chute closing position, allow the lever 34 to be pushed to the chute outlet closing position by stuffing material entered into the coin return bucket 14 from the front and sliding beneath the lever.

It should also be observed that applicants have provided a method for preventing the stuffing by a string of blocking material in the bottom end of a pay telephone coin return chute via its outlet opening from the front opening of a coin return bucket. This method comprising the steps of closing-off the chute outlet opening 26 with a lever 34 spanning the opening and having a free end with a sharp edge 35 overlaping the edge of the opening, biasing the lever 34 to a normal position closing the chute outlet opening 26, and moving the lever 34 away from the normal position to allow the coin return chute 12 to discharge its collected coins when the door 16 biased to a normal closing position for the front opening of the coin return bucket 14 is swung inward and allowing the lever 34 to return to normal position when the door 16 restores to its normal position. The return of the lever 34 to its normal position renders the sharp edge 35 on its opening-overlapping free end highly effective to cut a string passed through the telephone attached via a hole cut in it to a coin which was retrieved from the bucket 14 and replaced with stuffing material and then being pulled from the telephone coin entry slot back-up in an effort to place the stuffing material in the chute 12via the cold return bucket 14.

It will be apparent that applicants have invented an anti-stuffing device and methods which will discourage vandals attempting to practice the old as well as the new stuffing tricks.

It will also be apparent to those skilled in the art that the principles of the invention may be applied in other and different embodiments. Accordingly it is intended to be limited only by the scope or spirit of the appended claims.

What is claimed is:

1. For use in a coin-operated pay telephone, a coin return assembly embodying
   a coin return chute possessing
      a floor terminating before the lower end of the chute to form a floor opening for passing coins to be returned to unsuccessful callers and
      a wall at the end of the chute for stopping coins coming down the chute,
   an upwardly-open coin return bucket below the floor opening and having a front opening,
   a door biased to a normal position closing-off said bucket front opening,
   a movable structure in its normal position closing-off said chute floor opening, and
   a mechanism interconnecting said movable structure and said door to move the structure from its normal position to one uncovering the floor opening to pass into the coin return bucket any coins stopped by the bucket wall, wherein the movable structure is a lever spanning the floor opening, wherein the lever is pivoted at the lower end of the chute end wall, wherein the mechanism includes a lever fixed to the pivoted lever, and a compression spring attached at one end to the fixed lever and at its other end to the lower end to the door closing off the front bucket opening and of such length as to hold the pivoted lever in its normal position closing-off the floor opening when the door is in its normal position closing-off the front bucket opening.

2. For use in a coin-operated pay telephone, a coin return assembly embodying
   a coin return chute possessing
      a floor terminating before the lower end of the chute to form a floor opening for passing coins to be returned to unsuccessful callers and
      a wall at the end of the chute for stopping coins coming down the chute,
   an upwardly-open coin return bucket below the floor opening and having a front opening,
   a door biased to a normal position closing-off said bucket front opening,
   a movable structure in its normal position closing-off said chute floor opening, and
   a mechanism interconnecting said movable structure and said door to move the structure from its normal position to one uncovering the floor opening to pass into the coin return bucket any coins stopped by the bucket wall, wherein the movable structure is a lever spanning the floor opening, wherein the lever is one leg of a compound lever whose other leg is part of the moving mechanism, wherein the two legs are pivoted at the lower end of the chute end wall, wherein the mechanism includes the other leg of the compound lever, and a compression spring attached at one end to the free end of the other leg of the compound lever and at its other end to the lower end to the door closing off the front bucket opening and of such length as to hold the pivoted lever in its normal position closing-off the floor opening when the door is in its normal position closing-off the front bucket opening.

3. For use in a coin-operated pay telephone, a coin return assembly embodying
   a coin return chute possessing
      a floor terminating before the lower end of the chute to form a floor opening for passing coins to be returned to unsuccessful callers and
      a wall at the end of the chute for stopping coins coming down the chute,
   an upwardly-open coin return bucket below the floor opening and having a front opening,
   a door biased to a normal position closing-off said bucket front opening,
   a movable structure in its normal position closing-off said chute floor opening, and
   a mechanism interconnecting said movable structure and said door to move the structure from its normal position to one uncovering the floor opening to pass into the coin return bucket any coins stopped by the bucket wall, wherein the movable structure is a lever spanning the floor opening, wherein the lever is one leg of a compound lever whose other leg is part of the moving mechanism, wherein the two legs are pivoted at the lower end of the chute end wall, wherein the other leg of the compound lever extends upwardly in front of the chute end wall, wherein the mechanism includes the other leg of the compound lever, and a compression spring attached at one end to the free end of the other leg of the compound lever and at its other end to the lower end to the door closing off the front bucket opening and of such length as to hold the pivoted lever in its normal position closing-off the floor opening when the door is in its normal position closing-off the front bucket opening.

4. A coin return assembly according to claim 3, wherein the free end of the one leg of the pivoted lever is a sharp edge for cutting string pulled thereagainst.

5. A coin return assembly according to claim 3, wherein the coin return bucket also has a rear opening and the door closing off the front bucket opening has at its free end a structure rearwardly extending into the bucket, and a door biased to a normal position closing-off the bucket back opening and being displaceable to open position by stuffing material in the bucket pushed rearwardly when engaged by the structure on swinging-in of the lower end of the front door.

6. A coin return assembly according to claim 3, wherein free end of the other leg of the compound lever strikes the end wall to limit the excursion of the compound lever under the force of the compression spring when the bucket front door is moved inwardly.

7. A coin return assembly according to claim 3, wherein the free end of the one leg of the pivoted lever overlaps the floor opening and is a sharp edge for cutting string pulled thereagainst, wherein the coin return bucket also has a rear opening and the door closing off the front bucket opening has at its free end a structure rearwardly extending into the bucket, and a door biased to a normal position closing-off the bucket back opening and being displaceable to open position by stuffing material in the bucket pushed rearwardly when engaged by the structure on swinging-in of the lower end of the front door, and wherein free end of the other leg of the compound lever strikes the end wall to limit the excursion of the compound lever under the force of the compression spring when the bucket front door is moved inwardly.

\* \* \* \* \*